United States Patent

[11] 3,602,749

| [72] | Inventor | Ernie B. Esters |
| | | 1456 Burlingame, Detroit, Mich. 48206 |
| [21] | Appl. No. | 12,963 |
| [22] | Filed | Feb. 20, 1970 |
| [45] | Patented | Aug. 31, 1971 |

[54] DYNAMOELECTRIC MACHINE
10 Claims, 6 Drawing Figs.

| [52] | U.S. Cl. | 310/154, 310/266 |
| [51] | Int. Cl. | H02k 21/28 |
| [50] | Field of Search | 310/40, 46, 154, 266 |

[56] References Cited
UNITED STATES PATENTS

| 393,636 | 9/1888 | Freeman | 310/269 X |
| 3,054,916 | 9/1962 | Cobb | 310/154 |

FOREIGN PATENTS

| 1,072,507 | 6/1967 | Great Britain | 310/269 |

Primary Examiner—D. X. Sliney
Attorney—Hauke, Gifford and Patalidis

ABSTRACT: A dynamoelectric machine capable of operating in a motor mode or in a generator mode and having coaxial inner and outer stators and a pair of end stators with each stator being provided preferably with magnetic flux producing permanent magnets. The rotor is disposed in the magnetic gap between the inner and outer stators and the end stators and comprises a plurality of radially disposed coils, wound magnetic cores and intermediary coilless magnetic cores disposed between consecutive coil wound cores.

PATENTED AUG 31 1971 3,602,749

INVENTOR
ERNIE B. ESTERS

BY Hauke, Gifford & Patalidis

ATTORNEYS

FIG. 3
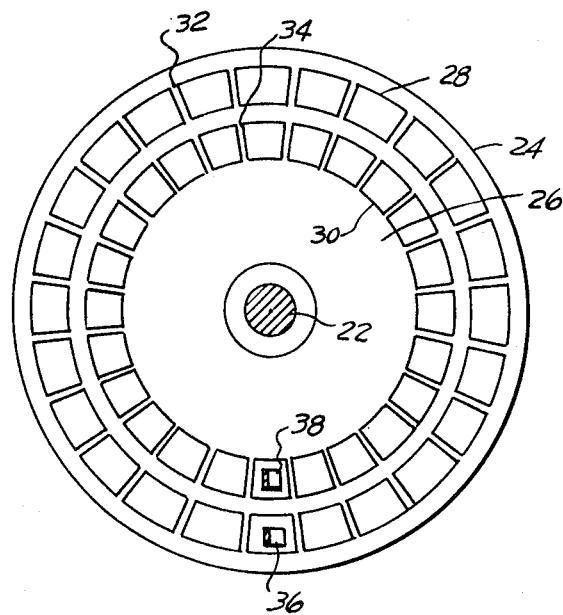
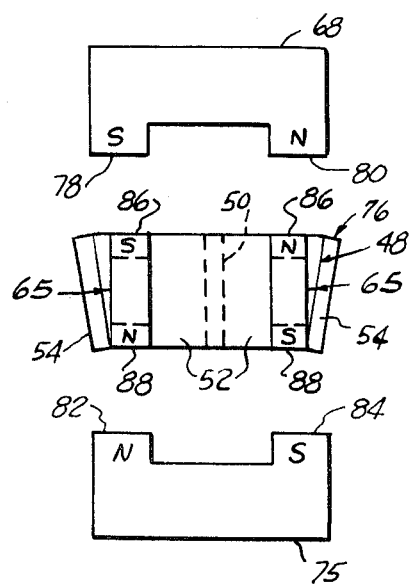
FIG. 4
INVENTOR
ERNIE B. ESTERS
BY Hauke, Gifford & Patalidis
ATTORNEYS

INVENTOR
ERNIE B. ESTERS

BY *Haulke, Gifford & Patalidis*

ATTORNEYS

DYNAMOELECTRIC MACHINE

BACKGROUND OF THE INVENTION

I. Field of the Invention

The invention relates to dynamoelectric machines, such as electric motors and generators, and more particularly to dynamoelectric machines provided with a unique arrangement and construction of the stators and rotor so as to achieve a high degree of efficiency.

II. Description of the Prior Art

Most conventional dynamoelectric machines, motors, as well as generators, are of the radial gap type, generally having an annular stator and a cylindrical rotor disposed internally of the stator. Electric current supplied to the windings of the rotor and/or stator generates magnetic fields in the rotor and/or stator.

In electric motors, these fields react with each other or other fields created by permanent magnets to produce forces of attraction and repulsion between the rotor and stator. In electric generators, rotation of the rotor causes an EMF to be induced in the windings. In such motor or generator arrangements, attractive and repulsive forces and induced EMF are created at the cylindrical interface between the rotor and stator.

Another type of electric motors and generators, often called the axial gap type, is provided with a disclike rotor, keyed to a rotatable shaft, and the stator or stators are axially arranged relatively to the rotor such that the interface, or gap, through which the attractive and repulsive forces of the magnetic fields are created in motors and the variable magnetic flux inducing an EMF in generators, is axially or longitudinally aligned with respect to the machine housing and rotatable shaft.

A further type of dynamoelectric machines, best represented by the structures disclosed in Applicant's prior U.S. Letters Pat. Nos. 3,396,296 and 3,426,226, issued respectively Aug. 6, 1968 and Feb. 4, 1969, presents the combined advantages of both the radial-gap and axial-gap types. A first cylinder stator is disposed within a hollow cylindrical rotor and a second stator, also cylindrical in shape, is disposed so as to surround the rotor. Additionally, third and fourth stators are preferably provided on the ends of the rotor so as to form an axial gap, or interface, between the annular ends of the rotor and the magnetic field created by such stators. An electric motor or generator built according to such principle has a far greater efficiency than conventional motors or generators in view of the improved interreaction between a multitude of magnetic fields and electrical windings.

SUMMARY OF THE INVENTION

The present invention has for a primary object to provide electric motors and generators having unique rotor-stator configurations, whereby attractive and repulsive forces, or induced EMF, are generated at a plurality of interfaces between the rotor and the stators, resulting in a more efficient device. The unique configuration of the present invention includes a rotor which takes the form of a cylinder supported for rotation between a first stator which is cylindrical in form and supported adjacent the inner diameter of the cylindrical rotor and a second cylindrical stator which surrounds the rotor. An end stator is provided adjacent each end of the rotor.

An important aspect of the present invention relates to the rotor structure which includes a plurality of axially elongated magnetically permeable cores. Every other core is provided with a winding generating a radial magnetic field, in the motor application of the invention, and the windings are parallel or series-connected in such manner that all the windings are generating magnetic fields all directed in the same direction at a given time. Each core disposed between consecutive cores provided with a winding acts as a collector for a magnetic field directed in an opposite direction such that a plurality of magnetic fields, opposedly directed two by two, are created in the stator by way of only half the number of windings required in conventional structures.

DESCRIPTION OF THE DRAWINGS

The several objects and advantages of the invention will become apparent to those skilled in the art when the following description of one of the best modes contemplated for practicing the invention is used in conjunction with the accompanying drawings wherein like reference characters refer to like parts throughout the several views and in which:

FIG. 3 is a view from line 3—3 of FIG. 2 showing the commutator disc;

FIG. 4 is a partial schematic diagrammatic end view of one of the rotor coils of the dynamoelectric machine, shown in a grossly exaggerated manner for the purpose of explaining the principle of the invention;

DETAILED DESCRIPTION OF THE PREFERRED EMBODIMENT

Figure 1:
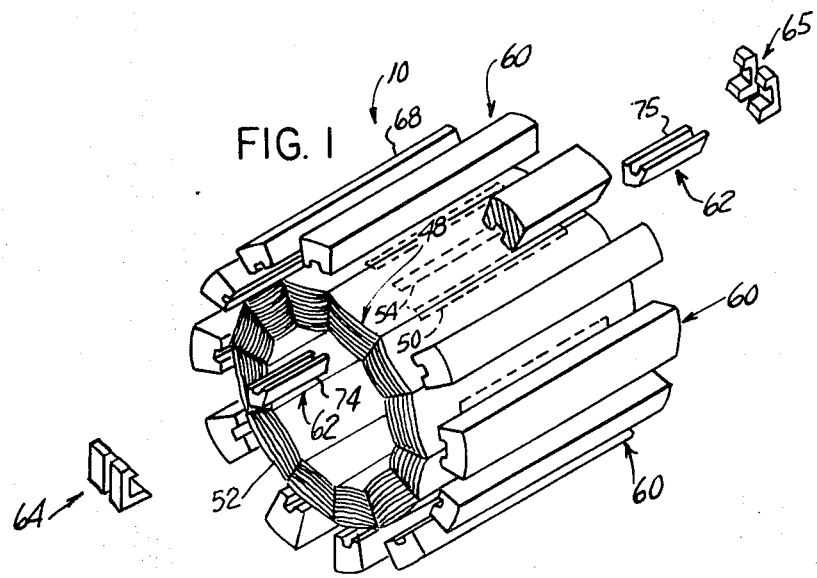
FIG. 1 is an exploded perspective view of a portion of a dynamoelectric machine in accordance with the present invention.
Figure 2:
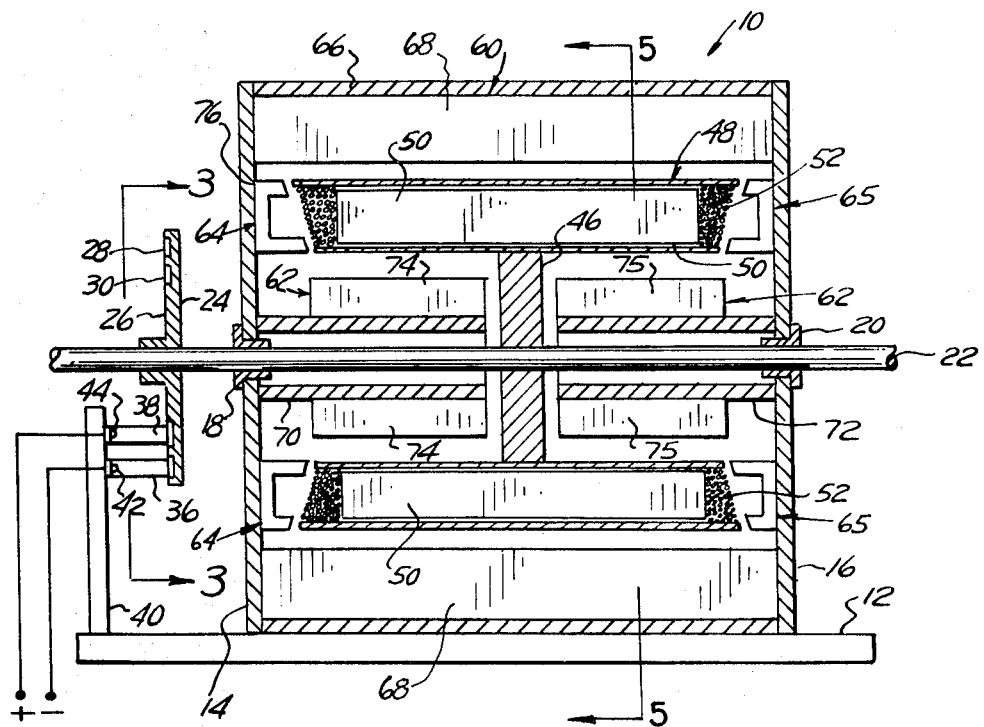
FIG. 2 is a longitudinal sectional view of a dynamoelectric machine in accordance with the present invention.

Referring to FIGS. 1 and 2, a dynamoelectric machine according to the present invention, generally indicated at 10, comprises, as best shown in FIG. 2, a horizontal base or frame 12 which carries a pair of upright vertical end plates 14 and 16 secured thereto by any convenient means, such as welding, bonding or the like.

The base 12 and the end plates 14 and 16 may be formed of metal or other material providing the necessary rigidity. The end plates 14 and 16 support a pair of sleeve bearings 18 and 20 in which is journaled a rotatable shaft 22. The shaft 22 extends beyond the end plates 14 and 16 at either end so as to be coupled to a driving or driven member according to whether the dynamoelectric machine 10 is used as a generator or a motor.

Referring to FIGS. 2 and 3, a commutator disc 24 is secured to the shaft 22 adjacent the end plate 14. The commutator disc 24 is formed of a rigid insulating material and supports on its outer face 26 a plurality of conductive commuter strips 28 and 30 arranged in two concentric rings. As shown in FIG. 3, the strips 28 and 30 are arcuate in shape and separated by thin insulating segments 32 and 34, respectively, which may be formed integrally with the disc 24. The outer surfaces of the conductive strips 28 and 30 and insulating surfaces of segments 32 and 34 are s flush with one another so as to form continuous flat surfaces.

A pair of spring-biased brushes 36 and 38 or, alternately, formed of similar strips of spring metal, have their free ends engaged against the concentric rings formed by the strips 28 and 30, respectively. The free ends of the brushes 36 and 38 make contact with the separate consecutive conductive commuter strips 28 and 30 as the commutator disc 24 rotates in unison with the shaft 22. The other ends of the brushes 36 and 38 are supported as, for example, being attached to an insulating support block 40, which is fixedly secured to the base member 12 by any convenient means.

Figure 6:
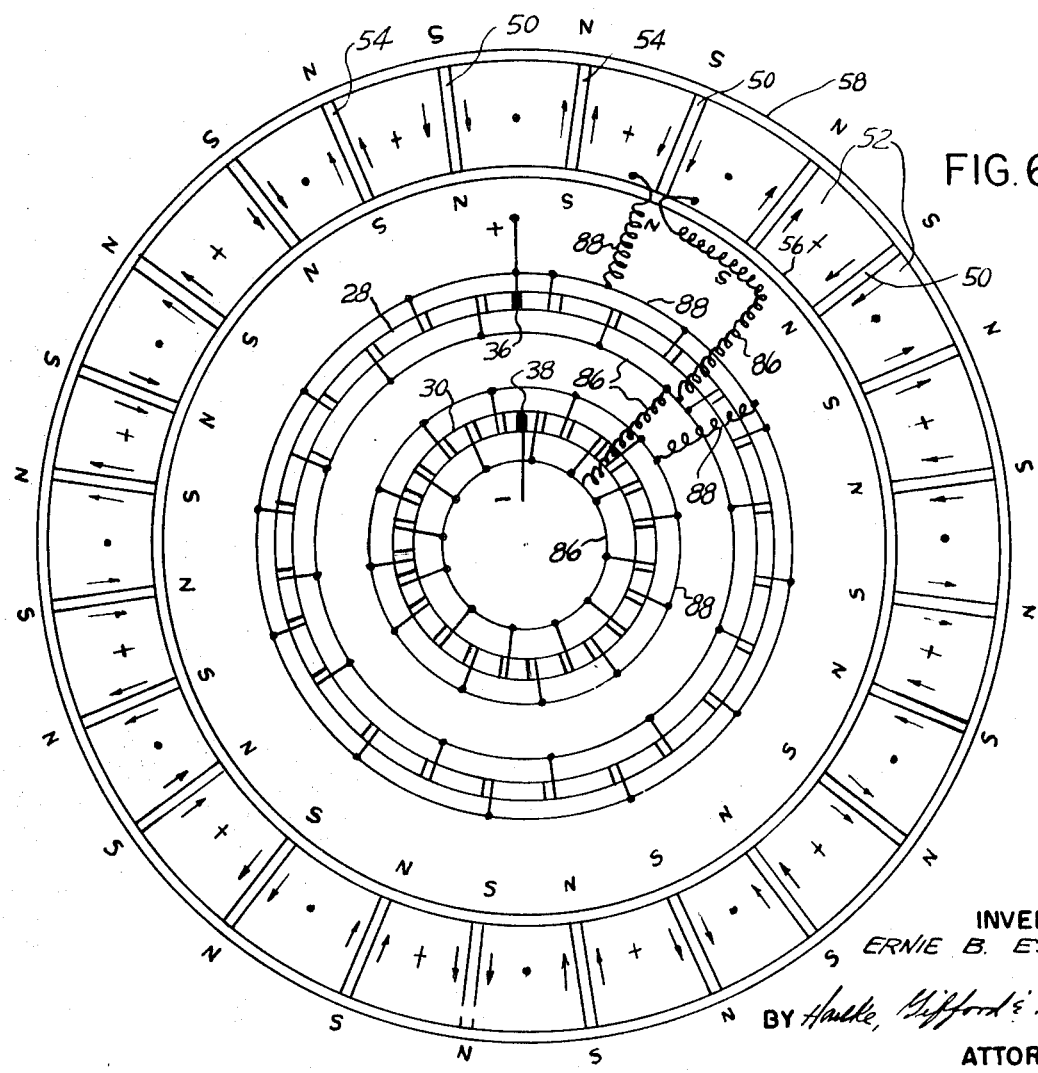
FIG. 6 is a schematic wiring diagram illustrating the electrical connection between the commutator of the dynamoelectric machine of the invention and the rotor windings thereof for operation in a DC mode.

A source of electrical power, either direct or alternating current, as hereinafter described, may be connected across the brushes 36 and 38 by means of terminals 42 and 44, respectively, in the motor version of the electrical machine of the invention, while terminals 42 and 44 are connected across a utilization circuit in the generator version thereof. The strips 28 and 30 are connected by wires, as shown in FIG. 6, to the rotor windings or coils, as will be hereinafter explained in further details.

As shown in FIG. 2, the shaft 22 carries a rotor disc 46 secured thereto approximately midway between the end plates 14 and 16. A plurality of elongated rotor electromagnets, generally indicated at 48, are attached to the disc 46 by any convenient means at regular intervals around its perimeter. Referring to FIGS. 1, 2, 5 and 6, each electromagnet 48 includes an elongated flat central magnetic core 50, made of a magnetically permeable metal, which extends radially outward with respect to the shaft 22 and had its axis of elongation substantially parallel thereto. Each of the electromagnets 48 includes a single multiturn electric coil 52 wound around the core 50 substantially parallel to the axis of elongation of the core and to the longitudinal axis of the dynamoelectric machine. All the coils or windings 52 are electrically connected and are wound around their respective magnetic cores 50 such that, at any given time, the electric current circulating in the coils or windings circulates in the same direction. It is a matter of choice as to whether the coils 52 are electrically connected in series or in parallel, as long as, at any given time, the electric current circulates in all the coils in the same direction so as to create magnetic fields substantially aligned radially along the radial axes of the magnetic cores 50.

Figure 5:
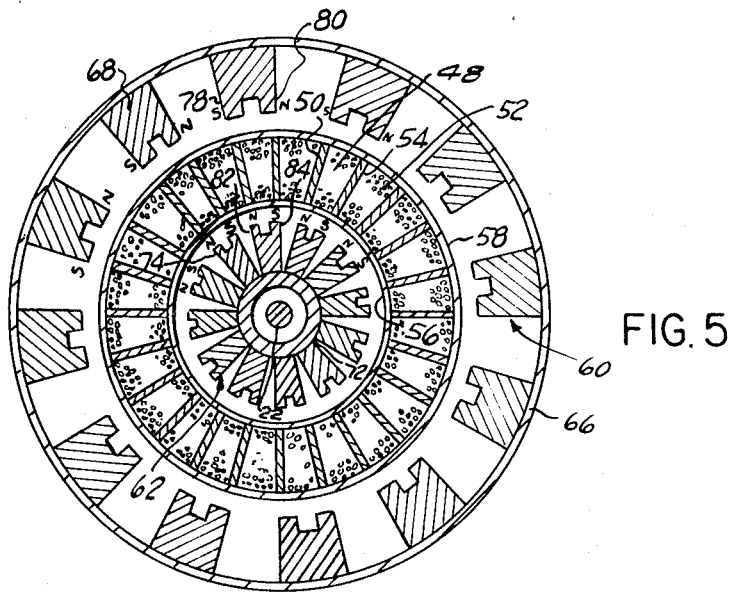
FIG. 5 is a sectional view of the rotor and stators of the dynamoelectric machine of the present invention taken along line 5—5 of FIG. 2.

Referring to FIGS. 1 and 5, adjacent electromagnets 48 are separated by magnetic cores 54 made of elongated flat metal members similar to the coil-wound magnetic cores 50 and which also extend radially outwardly with respect to the shaft 22 and have their axis of elongation substantially parallel thereto. As shown in on 5, the electromagnets 48 and the intermediate magnetic cores 54 form a hollow cylindrical rotor structure preferably provided with an inner covering 56 and an outer covering 58 made of bonded varnish-impregnated fabric or paper.

The dynamoelectric machine of the present invention includes an outer stator, generally indicated at 60 in FIGS. 1 and 2, an inner stator, indicated at 62, and a pair of end stators, indicated at 64 and 65, all supported in the space provided between the end plates 14 and 16. The outer stator 60 is connected between the end plates 14 and 16 and is surrounded by a cylindrical outer housing 66, best shown in FIGS. 2 and 5. Referring to FIGS. 1, 2 and 5, the outer stator 60 is composed of a plurality of elongated horseshoe shaped permanent magnets 68 arranged at equal angular intervals around the shaft 22 and spaced therefrom with their axes of elongation substantially parallel to the axis of the shaft. The number of magnets 68 is preferably equal to the number of rotor electromagnets 48, which in the illustrated embodiment is twelve.

The inner stator 62 is supported by a pair of cylindrical support members 70 and 72 which surround a portion of the shaft 22 on opposite sides of the disc 46 and have one end secured to the inner surface of the end plates 14 and 16, respectively. Referring to FIGS. 2 and 5, each of the cylindrical support members 70 and 72 supports on its outer surface a plurality of elongated horseshoe shaped permanent magnets 74 and 75, respectively, disposed at equal angular intervals thereon with their axes of elongation substantially parallel to the axis of the shaft 22. As shown in FIG. 2, each of the magnets 74 secured to the cylindrical support member 70 is paired with a magnet 75 secured to the cylindrical support member 72 so as to be axially aligned therewith. As shown in FIG. 5, each pair of longitudinally aligned magnets 74, 75 mounted on cylindrical support members 70 and 72 acts as one magnet and is radially aligned with one of the outer stator magnets 68. Thus, the number of pairs of inner stator magnets is equal to the number of outer stator magnets, which in the illustrated structure is equal to 12.

Each of the end stators 64 is formed with a plurality of inwardly facing horseshoe shaped permanent magnets 76 secured to the end plates 14 and 16 adjacent the longitudinal ends of the electromagnets 48. Referring to FIG. 4, there are two end magnets 76 on each of the plates 14 and 16 for each of the outer stator magnets 68. Thus, in the illustrated structure there are 24 end magnets secured to each of the end plates 14 and 16.

Referring to FIG. 5, as one of the electromagnets 48 is energized, its magnetic field interacts with the magnetic fields of a pair of adjacent permanent magnets 68 and 74 of the outer and inner stators, respectively, and with the end stator magnets 76. It is assumed that the brushes 36 and 38 are connected to a direct current source and supply this direct current to the commutator segments 28 and 30. The commutator segments are so connected to the electromagnets 48 that the magnetic poles of any one of the electromagnets, assuming that the rotor turns in a clockwise direction as viewed in FIG. 5, are opposite from the poles of the permanent magnet into which it is rotating. It will be noted that the legs 78 and 80 of the permanent magnets of the outer stator 60 alternate in polarity with a north pole being disposed adjacent to the south pole. Furthermore, the legs 82 and 84 of the permanent magnets of the inner stator 62 alternate in polarity with a north pole being disposed adjacent to a south pole. The permanent magnets of the inner and outer stator are oriented such that a north pole of an outer stator magnet 68 faces the south pole of a radially opposite leg of the inner stator and vice versa.

Referring to FIG. 4, the outer leg 86 and the inner leg 88 of each permanent magnet of the end stators 64 and 65 are opposite in polarity from each other. The outer leg is of the same polarity as the leg of the outer stator magnet adjacent to it, and the inner leg is of the same polarity as the leg of the inner stator magnet adjacent to it.

As one of the electromagnets 48 approaches the legs 78 and 82, one of which is on the outer stator and the other on the inner stator, the inner and outer edges of the electromagnet core 50 approaches magnets of opposite polarity. The connections between the commutator 24 and the coils of the electromagnets 48 are such that when an electromagnet 48 approaches the pair of legs 78 and 82, its outer edge has a polarity opposite to that of leg 78 and its inner edge has a polarity opposite to that of leg 82. That is, the outer edge of the core 50 has a north pole polarity and the inner edge has a south pole polarity. This causes a force of attraction between the core 50 and the legs 78 and 82. At the time the core 50 is being attracted by the legs 78 and 82, the polarity of the set of legs 80 and 84 immediately counterclockwise of the legs 78 and 82 is such as to repulse the core 50. Thus, this combination of the repulsive and attractive forces causes a clockwise rotational movement in the rotor. As a particular electromagnet 48 passes between the legs 78 and 82, the commutator switches the current to reverse the magnetic polarity of the electromagnet core 50, causing the core 50 to be repulsed by the legs 78 and 82 and attracted by the legs 80 and 84. During the operation, the end stator magnets 76 utilize the magnetic flux produced at the ends of the electromagnet 48 to attract and repulse the electromagnets in the same manner as done by the legs 78, 80, 82 and 84, resulting in a more efficient motor.

Referring to FIGS. 5 and 6, the coil-less intermediary magnetic cores 54, disposed between the electromagnets 48 defined by the coils 52 wound around the magnetic cores 50, collect and channel in a reverse direction the magnetic flux created by the electromagnets 48. Expressed in other words, each coil-less magnetic core 54 behaves as a coil-wound core whose coil winding is wound in an opposite direction to the winding of the coils 52 wound around the magnetic cores 50. This is due to the fact that each coil-less magnetic core 54 is adjacent to two half coils 52 through which electrical current circulates, relatively to the core 54, in a direction opposite to the current flow through a full coil 52 relatively to each magnetic core 50. This is obvious from the schematic representation of FIG. 6 wherein are illustrated the alternate magnetic cores 50 and 54 and the direction of the current circulating through each coil 52 wound around each core 50. The direction of current flow at a given time is arbitrarily represented by dots (.) and plus (+) signs, each dot(.) arbitrarily indicating that, at such given time, the electrical current flowing through all the wires of a half coil 52 in any space between a core 54 and a core 50 is flowing substantially at a right angle to the plane of the drawing towards an observer looking at the drawing and each plus (+) sign arbitrarily indicating that the electric current flowing through all the wires of the other half coil 52 disposed between a core 50 and a core 54 is directed in an opposite direction, namely away from the observer. Consequently, at such particular time, the magnetic fields collected and channeled by the appropriate magnetic cores 50 and 54 is in a direction arbitrarily represented by the arrows, and such magnetic fields are respectively opposite to each other. The magnetic cores 54 thus form a second set of magnetic cores having outer edges of polarities opposite from that of the outer edges of the magnetic cores 50 and inner edges of polarities opposite to that of the inner edges of the cores 50. Thus, as a particular magnetic core 50 of an electromagnet 48 is attracted by the legs 78 and 82 and repulsed by the legs 80 and 84, the two cores 54 on each side of the particular electromagnet 48 are attracted by the legs 80 and 84 and repulsed by the legs 78 and 82.

Referring to FIG. 6, the number of each of the commutator strips 28 and 30 is equal to twice the number of electromagnets 48 in the rotor. The commutator strips 28 and 30 are connected in two sets. Starting at any point on the commutator and numbering the segments in either direction, all of the even segments are joined together by one common line 86, while all the odd segments are connected together by another common line 88. Each of the electromagnets 48 has its two ends connected across the lines in the same direction so as to produce a current flow in the same sense. In this manner, the two commutator connections on the strips 28 are connected to the two connections of the strips 30 such that radially adjacent strips are connected to different common lines. Since the brushes 36 and 38 bear against a pair of radially adjacent strips, they energize all of the electromagnets 48 so that similarly oriented magnetic poles are produced in the end of magnetic cores 50 and oppositely oriented magnetic poles are produced in the ends of all the magnetic cores 54. When the commutator rotates sufficiently so as to produce a current flow through the next adjacent set of strips, the current flows through the electromagnets in an opposite direction reversing the orientation of the magnetic poles of the cores 50 and likewise reversing the orientation of the magnetic poles of the cores 54.

It will be noted that the electric machine 10 may be used either as an electric motor or as a generator. Furthermore, the machine 10 may be used with alternating current by merely replacing the commutator 24 by a commutator having a pair of concentric rings for contacting the brushes 36 and 38.

Although I have described but one preferred embodiment of my invention, it is to be understood that various changes and revisions can be made therein without departing from the spirit of the invention or the scope of the appended claims.

1. In a dynamoelectric machine having a rotatably mounted shaft and a rotor for rotation in unison with said shaft, the combination comprising:
    support means mounted on said shaft for rotation therewith;
    a plurality of magnetically permeable cores mounted on said support means;
    a plurality of electrical coil windings each wound around every other magnetically permeable core and electrically connected such that an electric current circulating therethrough causes magnetic fields all directed in the same direction in said every other core and a magnetic field directed in an opposite direction in every one of the remaining cores;
    a frame having end plates, said shaft being journaled in said end plates;
    a plurality of permanent magnets forming an outer stator mounted on said frame and forming radially directed magnetic fields, the direction of each magnetic field being radially opposite to the direction of the magnetic field contiguous therewith;
    at least one inner stator support member affixed to one of said end plates coaxially to said rotor; and
    a plurality of permanent magnets mounted on said inner stator support member and forming radially directed magnetic fields, the direction of each magnetic field contiguous therewith, each magnetic field formed by the inner stator magnets being radially aligned and radially opposite in direction to a magnetic field formed by the outer stator magnets and forming therebetween a magnetic gap.

2. The combination of claim 1, wherein each of said cores is an elongated flat member having its axis of elongation substantially parallel to the axis of said shaft.

3. The combination of claim 2, wherein each of said coil windings is wound around its appropriate core with turns of wires in planes substantially parallel to the axis of said shaft.

4. In the dynamoelectric machine of claim 1, the combination further comprising:
    commutation means comprising a pair of commutation rings affixed to said shaft for rotation therewith;
    a first common line electrically connected to one of said rings and a second common line electrically connected to the second of said rings;
    means electrically connecting said electrical windings across said common lines such that the electrical current flowing in each of said electrical windings is periodically reversed during passage through each magnetic gap; and
    a pair of brushes, one of which is adapted to engage one of said rings whilst the other engages the other ring.

5. In the dynamoelectric machine of claim 1, the combination wherein said inner stator magnets and said outer stator magnets are horseshoe shaped magnets.

6. In the dynamoelectric machine of claim 4, the combination wherein said electrical windings are electrically connected across said first and second common lines such that current flows through said winding in the same direction.

7. In the dynamoelectric machine of claim 1, the combination wherein said inner and outer stators include elongated magnets having horseshoe shaped transverse cross sections, each of said elongated magnets having its axis of elongation substantially parallel to said shaft.

8. In the dynamoelectric machine of claim 1, the combination further comprising a plurality of permanent magnets forming end stators mounted on each end plate and having axially directed magnetic fields.

9. In the dynamoelectric machine of claim 8, the combination wherein each end stator includes a plurality of horseshoe shaped permanent magnets, each end stator magnet has one of its legs disposed immediately adjacent the end of one of the outer stator magnets and is of the same polarity thereof and the other leg disposed immediately adjacent the end of one of the inner stator magnets and is of the same polarity thereof.

10. In the dynamoelectric machine of claim 4, the combination wherein:
    each of said commutation rings includes a plurality of brush engaging strips, the number of strips in one commutation ring being equal to the number of strips in the other ring and to the number of radially aligned pairs of magnetic fields;
    said first common line is electrically connected to a group of alternate strips of both commutation rings and said second common line is electrically connected to a second group of alternate strips of both commutation rings; and
    said electrical connecting means connects said electrical windings across said common lines such that the direction of electrical current flow in each of said electrical windings is the same.

UNITED STATES PATENT OFFICE
CERTIFICATE OF CORRECTION

Patent No. 3,602,749      Dated August 31, 1971

Inventor(s) Ernie B. Esters

It is certified that error appears in the above-identified patent and that said Letters Patent are hereby corrected as shown below:

IN THE SPECIFICATION

Column 1, line 39, change "cylinder" to -- cylindrical.

Column 2, line 55, before "flush" cancel "s"

Column 3, line 28, after "in" cancel "on"

and insert --FIG.--

Column 4, line 14, before "south" change "the"

to -- a --

IN THE CLAIMS

Column 6, line 6 after "field" insert -- , being radially opposite to the direction of the magnetic field --

Signed and sealed this 4th day of April 1972.

(SEAL)
Attest:

EDWARD M. FLETCHER, JR.      ROBERT GOTTSCHALK
Attesting Officer               Commissioner of Patents